(12) United States Patent
Arimatsu

(10) Patent No.: US 6,945,212 B2
(45) Date of Patent: Sep. 20, 2005

(54) COMBUSTION CHAMBER STRUCTURE FOR INTERNAL COMBUSTION ENGINE

(75) Inventor: Kanjo Arimatsu, Atsugi (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 11/035,073

(22) Filed: Jan. 14, 2005

(65) Prior Publication Data

US 2005/0172932 A1   Aug. 11, 2005

(30) Foreign Application Priority Data

Feb. 10, 2004   (JP) .............................. 2004-034015

(51) Int. Cl.$^7$ ................................................ F02F 7/00

(52) U.S. Cl. ................................... 123/193.6; 123/308

(58) Field of Search ............................ 123/308, 193.6, 123/193.1, 306, 193.5

(56) References Cited

U.S. PATENT DOCUMENTS 4,881,501 A * 11/1989 Shinzawa et al. ........... 123/279
6,170,455 B1 * 1/2001 Eissler et al. ............. 123/193.6

FOREIGN PATENT DOCUMENTS

JP   H07-150945 A   6/1995

* cited by examiner

*Primary Examiner*—Bibhu Mohanty
(74) *Attorney, Agent, or Firm*—Shinjyu Global IP Counselors, LLP.

(57) ABSTRACT

A combustion chamber structure for an internal combustion engine is configured with a combustion chamber surface that has a recess disposed around at least a pair of intake openings. The recess defines a pair of intake opening formation surfaces surrounding the intake opening with a pair of steps formed between the combustion chamber surface and the intake opening formation surfaces. A connecting surface interconnects the intake opening formation surfaces. The connecting surface is also recessed from the combustion chamber surface to form a step therebetween and a communication space being formed between the intake openings.

15 Claims, 17 Drawing Sheets

INTAKE VALVE CLOSED

INTAKE VALVE OPEN
(LOW LIFT AMOUNT UNDER LOW SPEED
ENGINE OPERATING CONDITION)

INTAKE VALVE CLOSED

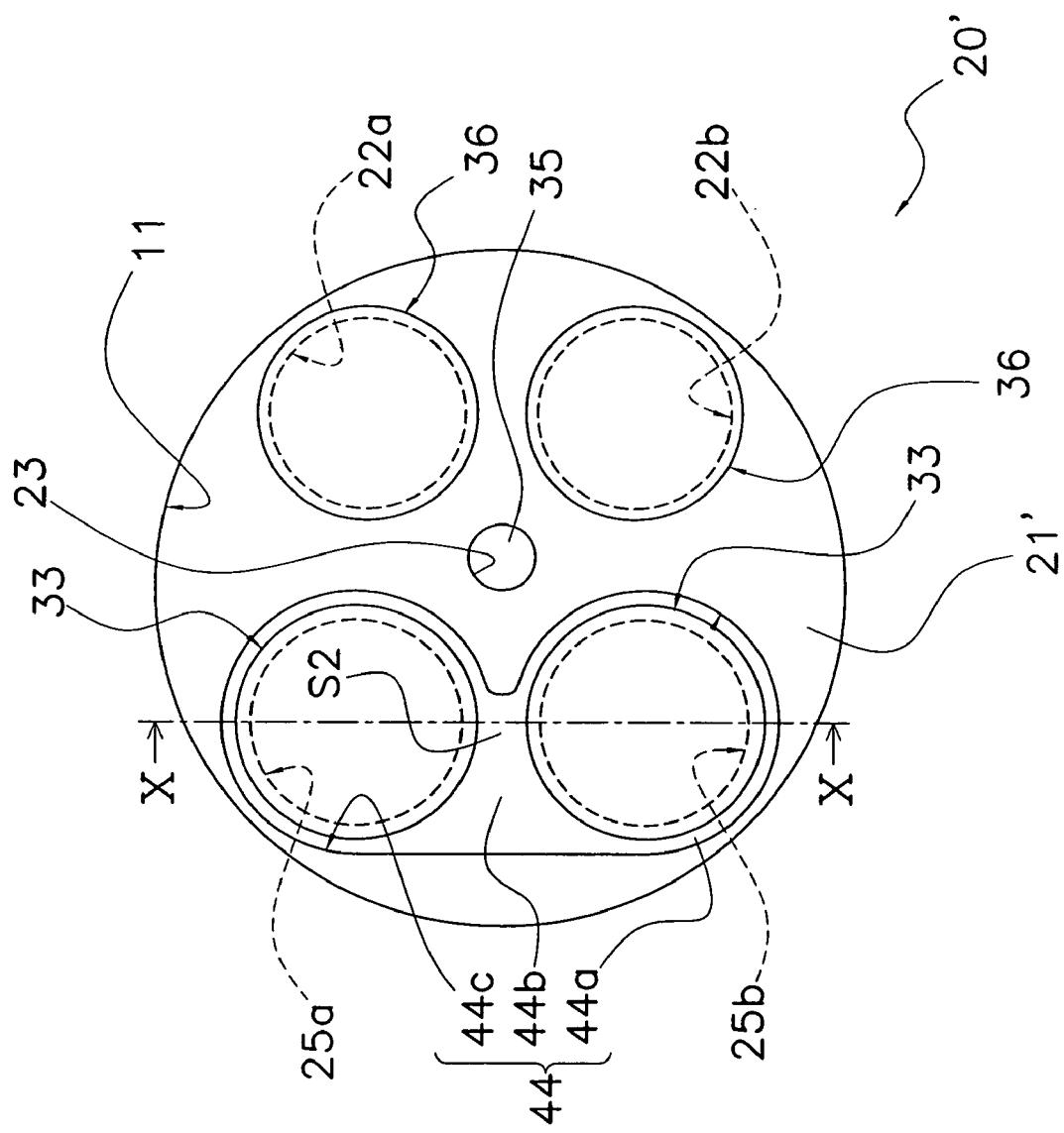

DISTRIBUTION OF AIR MASS FLOWING INTO COMBUSTION CHAMBER
(PROPORTIONAL DIFFERENCE FROM AVERAGE)

DISTRIBUTION OF TURBULENCE BETWEEN INTAKE VALVES
(PRESENT INVENTION)

DISTRIBUTION OF TURBULENCE BETWEEN INTAKE VALVES
(NO COMMUNICATION SPACE)

DISTRIBUTION OF TURBULENCE BETWEEN INTAKE VALVES
(NO RECESS PORTION)

TURBULENCE BETWEEN INTAKE VALVES DURING INTAKE STROKE

INTAKE VALVE OPEN
(LOW LIFT AMOUNT UNDER LOW SPEED ENGINE
OPERATING CONDITION)

INTAKE VALVE CLOSED

COMBUSTION CHAMBER STRUCTURE FOR INTERNAL COMBUSTION ENGINE

CROSS-REFERENCE TO RELATED APPLICATIONS

This application claims priority to Japanese Patent Application No. 2004-034015. The entire disclosure of Japanese Patent Application No. 2004-034015 is hereby incorporated herein by reference.

BACKGROUND OF THE INVENTION

1. Field of the Invention

The present invention generally relates to a combustion chamber structure for an internal combustion engine. More specifically, the present invention relates to a combustion chamber structure for an internal combustion engine in which an air-fuel mixture is drawn into a combustion chamber and combusted in the combustion chamber.

2. Background Information

A combustion chamber for an internal combustion engine with a piston reciprocating therein is usually formed by a lower surface of a cylinder head, a piston crown surface, and a cylinder bore wall surface. The lower surface of the cylinder head includes a plurality of intake openings and a plurality of exhaust openings. With an internal combustion engine in which a fuel injector is provided along an intake passage that opens to the combustion chamber through the intake openings, an air fuel mixture flows into the combustion chamber when intake valves coupled to the intake openings are opened. Then, after the fuel is combusted in the combustion chamber, the burned exhaust gas is discharged to an exhaust port by opening the exhaust openings by controlling the exhaust valves coupled to the exhaust openings.

For example, Japanese Laid-Open Patent Application H7-150945 discloses a combustion chamber structure in which a step structure is provided in a lower surface of the cylinder head around each intake opening. More specifically, in this reference, intake opening peripheral wall surfaces that surround the intake openings are provided to form a stepped surface around each intake opening. With such a combustion chamber structure, when the internal combustion engine has a variable lift mechanism configured and arranged to variably control an amount of valve lift, even when an amount of intake valve lift is reduced so that the amount of air-fuel mixture drawn into the combustion chamber is throttled, the air-fuel mixture that flows into the combustion chamber hits the stepped surfaces formed around the intake openings and changes the direction of the air-fuel mixture to move away from the cylinder head lower surface. As a result, the combustion state of the internal combustion engine is stabilized even when the valve lift amount of the intake valves is reduced when the internal combustion engine is operating in low engine speed or under low load operating condition.

Moreover, in the above mentioned reference, the stepped surface is formed such that when the intake valve is opened the gap between the stepped surface and the outer periphery surface of the intake valve is wider on the side close to the spark plug and narrower on a side opposite from the spark plug. With such a structure, tumble and swirl flow within the combustion chamber is increased as disclosed in the above mentioned reference.

In view of the above, it will be apparent to those skilled in the art from this disclosure that there exists a need for an improved combustion chamber structure for internal combustion engine. This invention addresses this need as well as other needs, which will become apparent to those skilled in the art from this disclosure.

SUMMARY OF THE INVENTION

With an internal combustion engine having a fuel injector disposed in an intake passage, atomization of the liquid fuel in the air-fuel mixture is desired epecially when temperatures of the intake port and intake valves are low immediately after start-up. This is because the stability of combustion in the combustion chamber will be compromised if the air-fuel mixture flowing into the combustion chamber contains liquid fuel with a large droplet size. Also, if liquid fuel with a large droplet size adheres to a wall surface around the exhaust openings of the combustion chamber, a high concentration of unburned fuel component will be discharged from the exhaust openings during an exhaust stroke, which results in a deterioration of emission.

Accordingly, one object of the present invention is to provide a combustion chamber structure for an internal combustion engine into which the air-fuel mixture is drawn and combusted, that promotes the atomization of the fuel in the air-fuel mixture.

In order to achieve the above identified object and other objects of the present invention, a combustion chamber structure for an internal combustion engine is provided that basically comprises a combustion chamber surface, a first intake opening formation surface, a second intake opening formation surface and a first connecting surface. The first intake opening formation surface surrounds a first intake opening. The first intake opening formation surface is recessed from the combustion chamber surface to form a first step. The second intake opening formation surface surrounds a second intake opening. The second intake opening formation surface is recessed from the combustion chamber surface to form a second step. The first connecting surface interconnects the first and second intake opening formation surfaces. The first connecting surface is recessed from the combustion chamber surface to form a first connecting step and a communication space being formed between the first and second intake openings. The peripheral wall surface extends from the first and second intake opening formation surfaces and the first connecting surface to the combustion chamber surface in a direction toward an inside portion of a combustion chamber to define the first and second steps and the first connecting step.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 8 is a bottom plan view (corresponding to FIG. 2) of a cylinder head lower surface of a combustion chamber with intake and exhaust valves in accordance with a second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
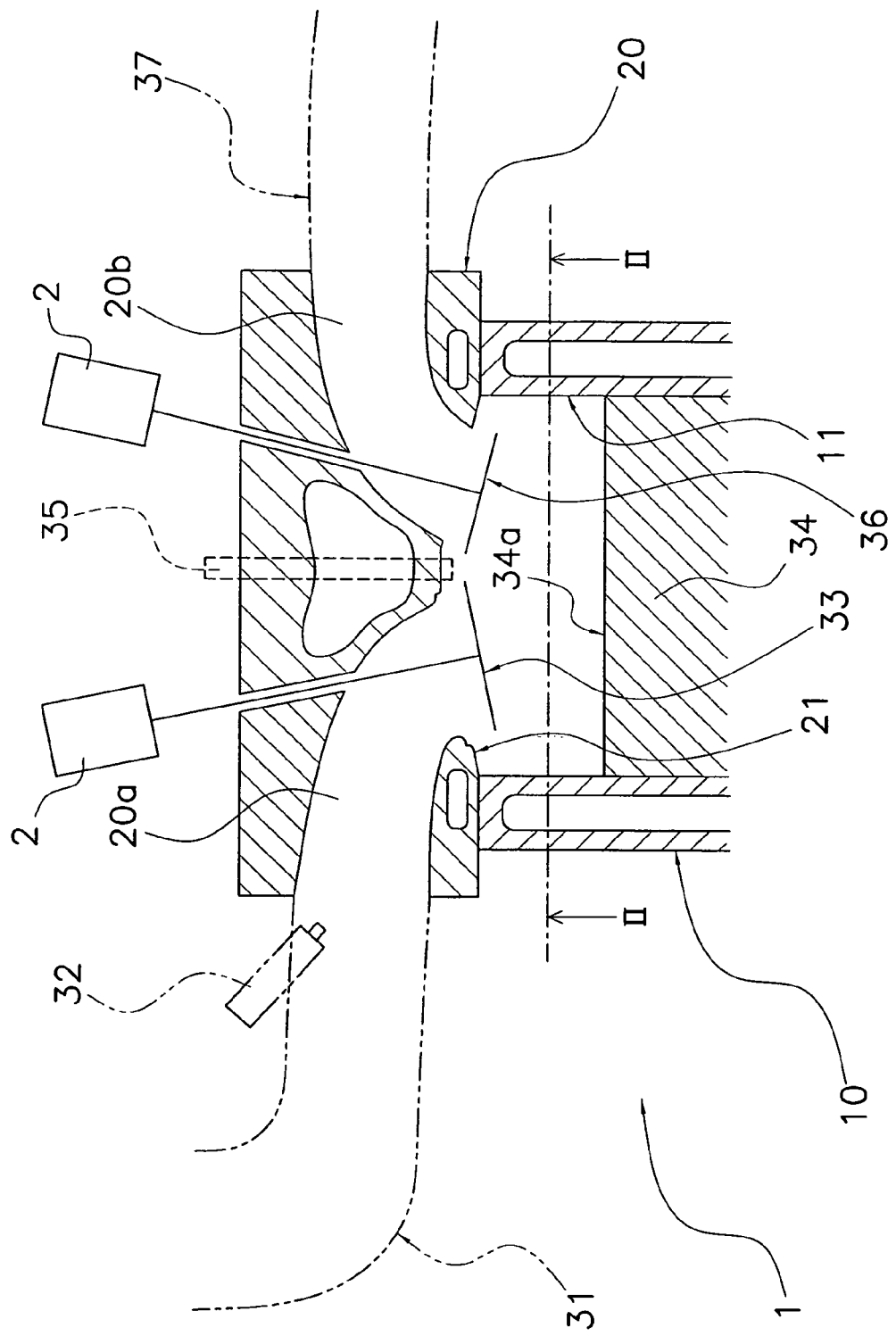
FIG. 1 is a simplified schematic diagram of an internal combustion engine with a combustion chamber structure in accordance with a first embodiment of the present invention.

Referring initially to FIGS. 1 to 7, an internal combustion engine 1 with a combustion chamber structure of the present invention is illustrated in accordance with a first embodiment. FIG. 1 is a schematic view of a combustion chamber and peripheral components of the internal combustion engine 1 in accordance with the first embodiment. The internal combustion engine 1 basically includes a cylinder head 20, a cylinder block 10 and a plurality of pistons 34 (only one piston is shown in FIG. 1) such that a plurality of combustion chambers (only one combustion chamber is shown in FIG. 1) are formed therein. More specifically, as seen in FIG. 1, the combustion chamber is basically defined by a crown surface 34a of the piston 34, a cylinder bore wall surface 11 defining a cylinder bore inside the cylinder block 10, and a lower surface of the cylinder head 20 or cylinder head lower surface 21. The piston 34 is slidably coupled to the cylinder bore wall surface 11 to reciprocate in the cylinder bore. As seen in FIG. 1, the cylinder head lower surface 21 is located across from the crown surface 34a of the piston 34 to form a top surface of the combustion chamber. Moreover, the cylinder head lower surface 21 preferably constitutes a combustion chamber surface.

Figure 2:
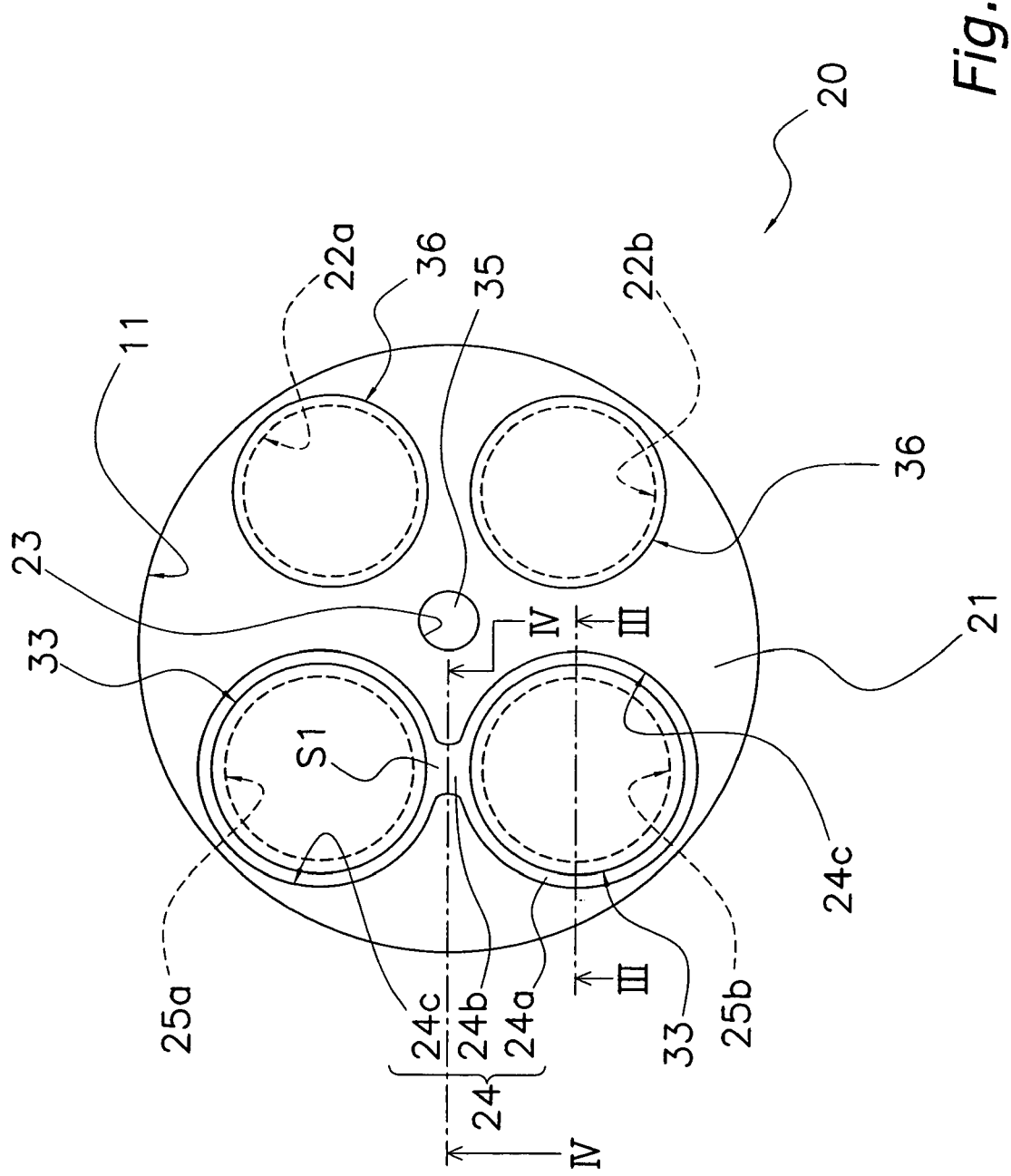
FIG. 2 is a bottom plan view of a cylinder head lower surface of a combustion chamber with intake and exhaust valves in accordance with the first embodiment of the present invention viewed in a direction of arrows II—II in FIG. 1.

FIG. 2 is a bottom plan view of the cylinder head lower surface 21 which basically forms the top surface of the combustion chamber as explained above. As seen in FIG. 2, first and second intake openings 25a and 25b are formed in the cylinder head lower surface 21 that are opened and closed by a pair of intake valves 33 coupled to the first and second intake openings 25a and 25b, respectively. Also, first and second exhaust openings 22a and 22b are formed in the cylinder head lower surface 21 that are opened and closed by a pair of exhaust valves 36 coupled to the first and second exhaust valves 36, respectively. The first and second intake openings 25a and 25b will be described in more detail below.

As seen in FIG. 1, the first and second intake openings 25a and 25b are connected to an intake port 20a in which a fuel injector 32 is provided. Therefore, when the intake valves 33 are opened, a mixture of fuel injected from the fuel injector 32 and air flowing through an air cleaner and an electrically-controlled throttle into an intake manifold 31 is drawn into the combustion chamber through the intake port 20a and the first and second intake openings 25a and 25b. When the exhaust valves 36 are opened after combustion in the combustion chamber, the burned exhaust is discharged through the first and second exhaust openings 22a and 22b, through exhaust port 20b coupled to the first and second exhaust openings 22a and 22b into an exhaust manifold 37. As seen in FIG. 1, the intake valves 33 and the exhaust valves 36 are preferably coupled to a pair of variable lift mechanisms 2 so that valve lift amount of the intake valves 33 and the exhaust valves 36 are variably controlled by the variable lift mechanisms 2. In other words, the variable lift mechanisms 2 are configured and arranged to control the intake valves 33 and the exhaust valves 36 to be opened and closed in varying amounts of lift. The variable lift mechanisms 2 will be discussed in more detail below.

As shown in FIGS. 1 and 2, a spark plug 35 is preferably arranged such that an ignition component (e.g., a discharge gap) of the spark plug 35 is disposed in an approximate center portion in the upper part of the combustion chamber. Furthermore, the internal combustion engine 1 is preferably provided with an engine control unit (not shown) that is configured and arranged to control the ignition timing of the spark plug 35, lift amount of the intake valves 33 and the exhaust valves 36, the opening degree of the electric throttle, the amount of fuel injected by the fuel injector 32, and so forth, according to the operating state of the internal combustion engine 1, the torque demand, and other such factors.

Detailed Structure of Area Around Intake Openings

The first and second intake openings 25a and 25b formed in the cylinder head lower surface 21 will now be described in detail.

Figure 3A:
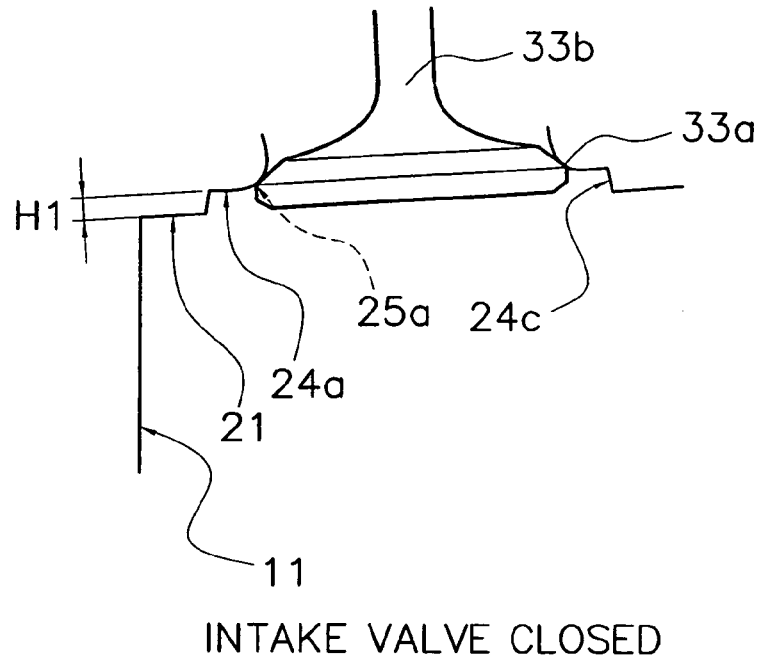
FIG. 3A is an enlarged schematic partial cross sectional view of the combustion chamber with an intake valve illustrating a state in which the intake valve is closed in accordance with the first embodiment of the present invention taken along a section line III—III in FIG. 2.
Figure 3B:
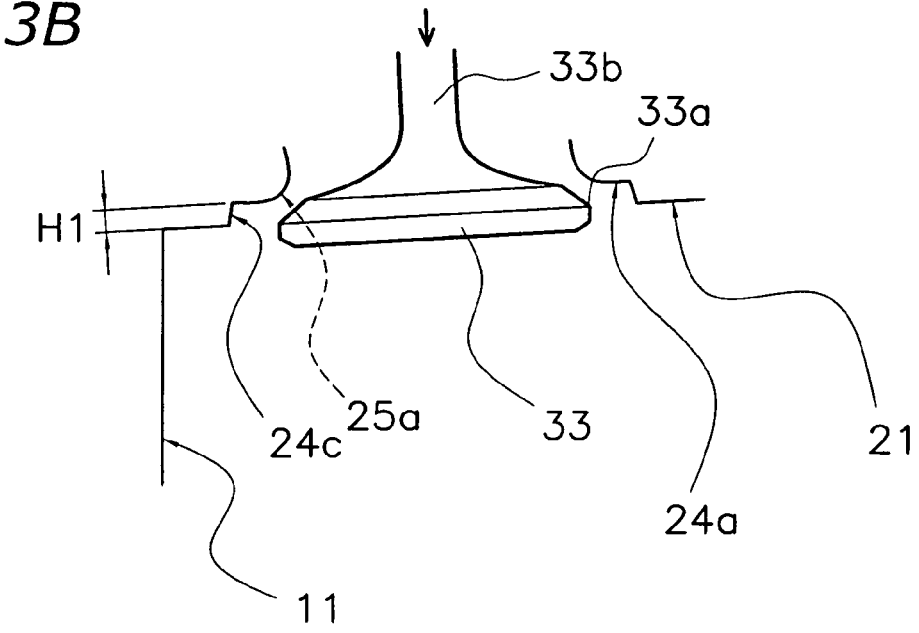
FIG. 3B is an enlarged schematic partial cross sectional view of the combustion chamber with the intake valve illustrating a state in which the intake valve is open in accordance with the first embodiment of the present invention taken along a section line III—III in FIG. 2.

As shown in FIGS. 2, 3A, and 3B, the first and second intake openings 25a and 25b are disposed in a recess portion 24 that is formed on the cylinder head lower surface 21. The recess portion 24 basically includes a bottom surface 24a, a connecting surface 24b, and a peripheral wall surface 24c as seen in FIG. 2. The bottom surface 24a and the connecting surface 24b are arranged to be recessed or stepped from the cylinder head lower surface 21 in a direction substantially parallel to stem portions 33b of the intake valves 33. In the first embodiment of the present invention, the bottom surface 24a includes two sections, i.e., first and second intake opening formation surfaces, that are formed with generally circular shapes surrounding the first intake opening 25a and the second intake opening 25b, respectively. Moreover, in the first embodiment, the recess portion 24 generally has a shape similar to a figure eight as shown in FIG. 2 with the bottom surface 24a and the connecting surface 24b together forming a substantially flat and continuous surface. In the first embodiment, the connecting surface 24b is continuously formed with the bottom surface 24a in the center portion between the first and second intake openings 25a and 25b. The wall surface 24c is continuously formed to define an outline of the recess portion 24 and extends from the bottom surface 24a and the connecting surface 24b toward an inside portion of the combustion chamber. In other words, the first and second intake openings 25a and 25b are formed within a single recess portion 24 as the first and second intake openings 25a and 25b surrounded by the continuously formed wall surface 24c.

Moreover, as shown in FIGS. 3A and 3B, the recess portion 24 is preferably arranged such that the wall surface 24c of the recess portion 24 is closely adjacent to outer peripheral edges of the intake valves 33 that are coupled to the first and second intake openings 25a and 25b. Furthermore, the recess portion 24 is preferably arranged to have a prescribed height H1 in a direction substantially parallel to a stem portion 33b of the intake valve 33 as seen in FIGS. 3A and 3B. In other words, the recess portion 24 is configured and arranged to form a step (including a first step formed by the first intake opening formation surface and a second step formed by the second intake opening formation surface) between the cylinder head lower surface 21 and the bottom surface 24a with the wall surface 24c extending therebetween by the prescribed height H1 as seen in FIGS. 3A and 3B.

As discussed in more detail below, the lift amount of the intake valves 33 are controlled by the variable lift mechanism 2 such that the intake valves 33 are opened at a low lift amount when lifted by low-speed cams 110 of the variable lift mechanism 2, and at a high lift amount when lifted by a high-speed cam 111 of the variable lift mechanism 2. The low lift amount of the intake valves 33 is preferably set to be equal to or less than a depth of the recess portion 24 (i.e., the prescribed height H1 in FIGS. 3A and 3B) of the step between the cylinder head lower surface 21 and the bottom surfaces 24a and 24b of the recess portion 24. More specifically, the low lift amount of the intake valves 33 is preferably set in a range approximately between 1.5 mm and 2 mm so that, when the intake valves 33 are opened by the low-speed cams 110 to their maximum lift amount, the bottom end of the wall surface 24c of the recess portion 24 is disposed from 0 mm to about 1 mm below bottom ends of valve faces 33a of the intake valves 33 (i.e., surfaces on head portions of the intake valves 33 that hit valve seat portions formed around the first and second intake openings 25a and 25b in the cylinder head 20) as seen in FIG. 3B. Accordingly, when the intake valves 33 open at a low lift amount, a particularly large proportion of the air-fuel mixture drawn into the combustion chamber flows first along the bottom surface 24a. Then, the direction of the flow is deflected downwardly by the wall surface 24c as the flow of air-fuel mixture flowing along the bottom surface 24a collides the wall surface 24c.

Figure 4:
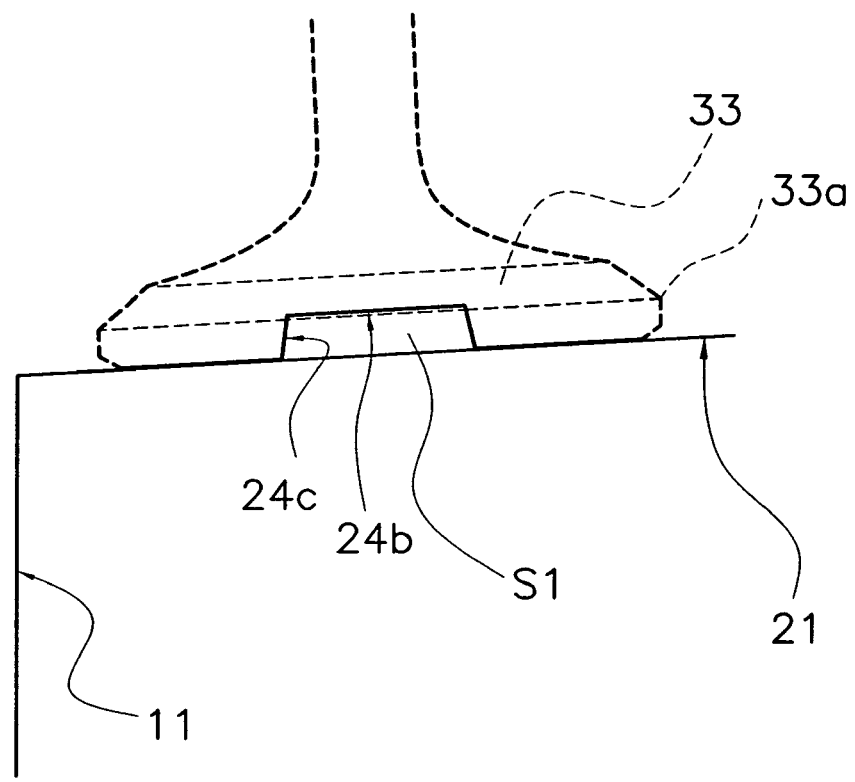
FIG. 4 is an enlarged schematic partial cross sectional view of the combustion chamber illustrating a state in which the intake valve is closed in accordance with the first embodiment of the present invention taken along a section line IV—IV in FIG. 2.

As mentioned above, in addition to the bottom surface 24a located around the first intake opening 25a and the second intake opening 25b, the recess portion 24 also has the connecting surface 24b located between the first intake opening 25a and the second intake opening 25b. In the first embodiment, the bottom surface 24a and the connecting surface 24c are preferably formed on the same plane such that the bottom surface 24a and the connecting surface 24c together form a flat base surface of the recess portion 24. Thus, the connecting surface 24b is configured and arranged to form a first connecting step between the connecting surface 24b and the cylinder head lower surface 21. As a result, a communication space S1 is formed in which the wall surface 24c is not present between the first and second intake openings 25a and 25b. The communication space S1 is configured and arranged to allow the air-fuel mixture flowing from the first and second intake openings 25a and 25b to communicate along the connecting surface 24b of the recess portion 24 as shown in FIGS. 2 and 4. More specifically, the communication space S1 is configured and arranged to allow the air-fuel mixture flowing from the first and second intake openings 25a and 25b to communicate beyond the peripheral surface of the bottom surface 24a of the recess portion 24 in the cylinder head lower surface 21. When the intake valves 33 are opened at a low lift amount, the air-fuel mixture flowing into the combustion chamber from the first intake opening 25a along the bottom surface 24a and the connecting surface 24c in a direction toward the communication space S1 collides with the air-fuel mixture flowing into the combustion chamber from the second intake opening 25b along the bottom surface 24a and the connecting surface 24c in a direction toward the communication space S1 in the communication space S1 and in a surrounding space thereof. This collision of the air-fuel mixture in the communication space S1 promotes the atomization of the liquid fuel contained in the air-fuel mixture.

Accordingly, since the communication space S1 is formed between the first intake opening 25a and the second intake opening 25b, the air-fuel mixture that has flowed from the first and second intake openings 25a and 25b into the combustion chamber tends to flow toward the adjacent intake opening side. As a result, more of the air-fuel mixture flows toward the adjacent intake opening side than with a conventional combustion chamber structure in which intake openings are surrounded by wall surfaces that form steps of a same height but no communication space is provided between the intake openings.

With the combustion chamber structure of the present invention, the air-fuel mixture that flows into the combustion chamber through the first intake opening 25a collides more frequently with the air-fuel mixture that flows into the combustion chamber through the second intake opening 25b. Thus, this collision between the air-fuel mixture promotes atomization of the fuel contained in the air-fuel mixture, and thus, the combustion state of the internal combustion engine 1 is improved. Moreover, the problem of the poor exhaust quality caused by unburned fuel components discharged from the combustion chamber can be reduced.

Detailed Structure of Variable Lift Mechanisms 2

Figure 5:
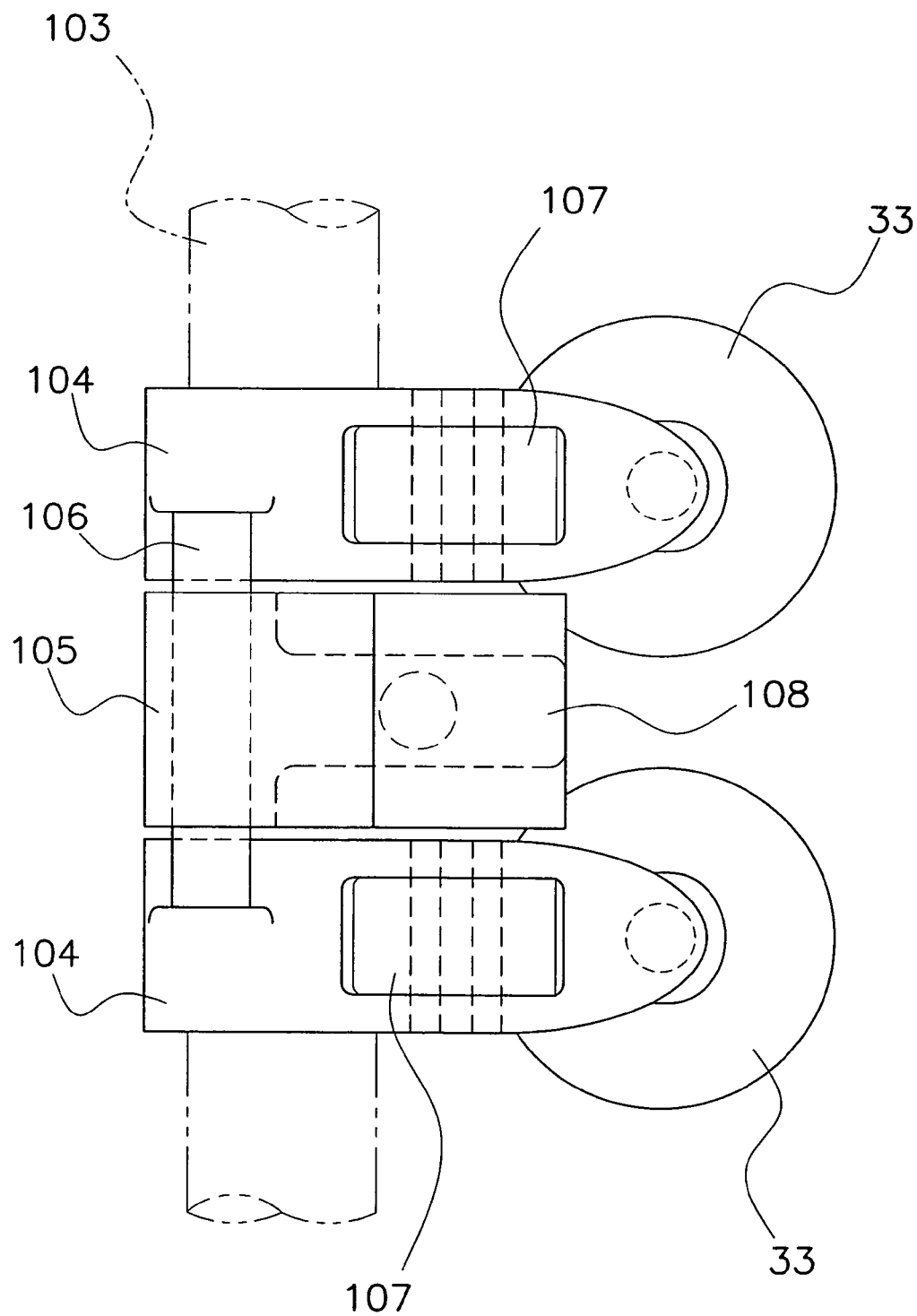
FIG. 5 is a top plan view of main components of a variable lift mechanism used in the internal combustion engine in accordance with the first embodiment of the present invention.
Figure 6:
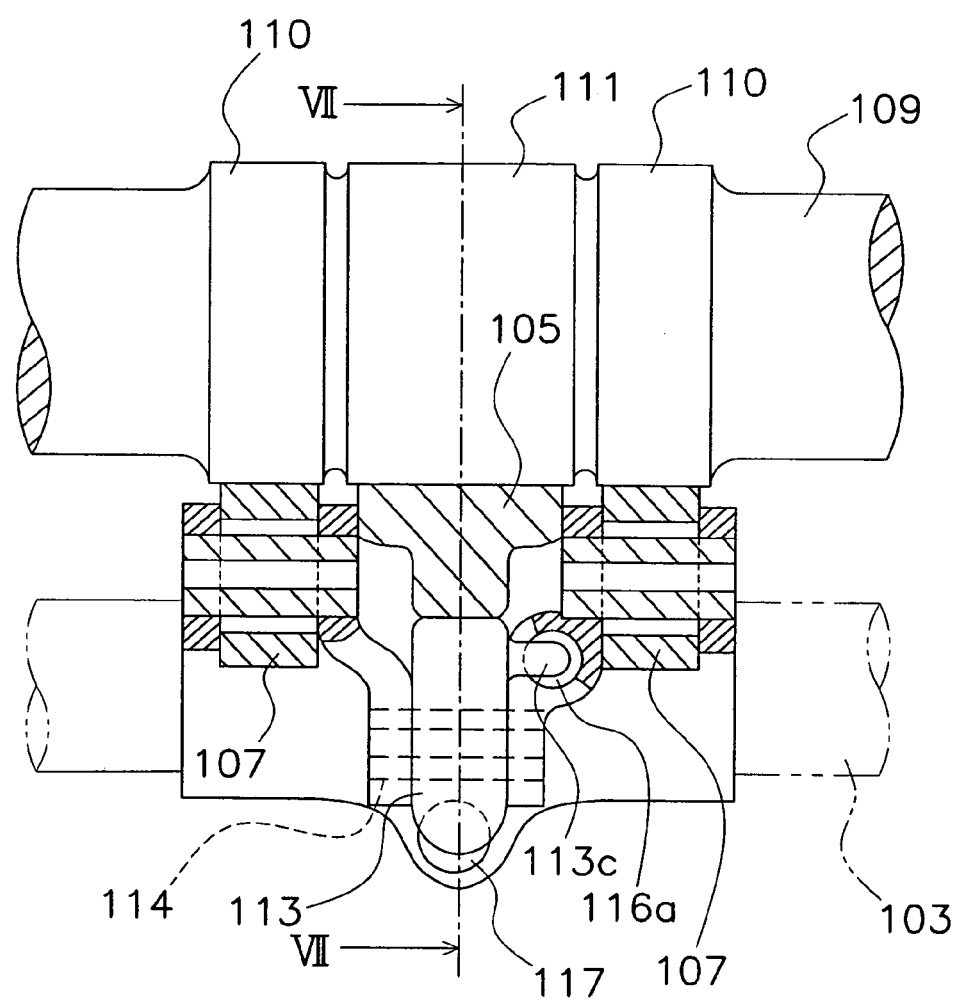
FIG. 6 is a partial cross sectional view of the variable lift mechanism illustrated in FIG. 5 in which a pair of rocker arms of the variable lift mechanism are partially cut away in accordance with the first embodiment of the present invention.
Figure 7:
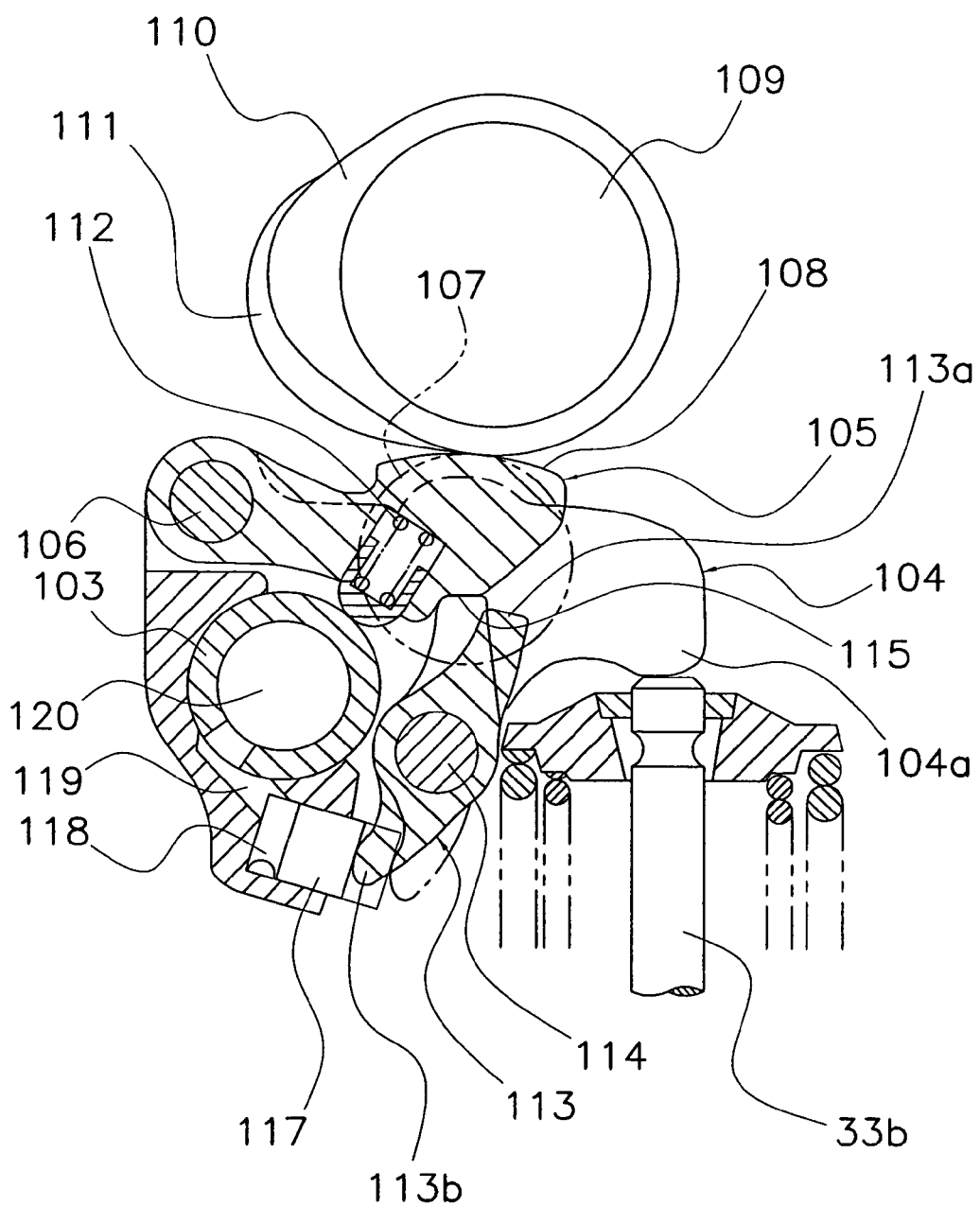
FIG. 7 is a cross sectional view of the variable lift mechanism illustrated in FIGS. 5 and 6 in accordance with the first embodiment of the present invention taken along a section line VII—VII in FIG. 6.

As mentioned above, when the intake valves 33 and the exhaust valves 36 are opened along their valve stems, the lift amount of the intake valves 33 and the exhaust valves 36 with respect to the first and second intake openings 25a and 25b and the exhaust openings 22a and 22b are preferably variably controlled by the variable lift mechanisms 2. FIGS. 5 to 7 illustrate the variable lift mechanism 2 configured and arranged to vary the lift amount of the intake valves 33 and the exhaust valves 36. In the following description, the variable lift mechanism 2 that controls the lift amount of the intake valves 33 will be described, but the same variable lift mechanism 2 can be utilized to control the exhaust valves 36. Moreover, the variable lift mechanism 2 used in the present invention is not limited to the structure explained below. Rather, any structure of variable lift mechanism can be utilized as the variable lift mechanism 2 of the present invention as long as such structure allows variable control of the lift amount of the intake valves 3 and the exhaust valves 3.

As seen in FIG. 5, the variable lift mechanism 2 basically comprises a rocker shaft 103, a pair of main rocker arms 104, a sub-rocker arm 105, a sub-rocker shaft 106, a cam shaft 109, and a linking mechanism for selectively linking the main rocker arms 104 and the sub-rocker arm 105. The main rocker arms 104 are swingably supported by the rocker shaft 103. Each of the main rocker arms 104 has a cam follower roller 107 disposed on an upper surface of the main rocker arm 104. The main rocker arms 104 are designed so that swinging end portions 104a of the main rocker arms 104 press on the upper end portions of the valve stems 33b of the intake valves 33 as seen in FIG. 7. The main rocker arms 104 are integrally formed together at lower parts of the main rocker arms 104.

The sub-rocker arm 105 is disposed to be sandwiched by a pair of the main rocker arms 104, and is swingably supported by the sub-rocker shaft 106. The sub-rocker shaft 106 is provided between the main rocker arms 104. The sub-rocker arm 105 is formed shorter than the main rocker arms 104, and a cam follower 108 is provided to the upper surface of a distal end portion of the sub-rocker arm 105.

The low-speed cams 110 and the high-speed cam 111 are provided in a row to the cam shaft 109 disposed above the rocker shaft 103. The pair of low-speed cams 110 are configured and arranged to provide a small lift amount of the intake valves 33. The low-speed cams 110 are in contact with the cam follower roller 107 of the main rocker arms 104. The high-speed cam 111 is configured and arranged to provide a large lift amount of the intake valves 33. The high-speed cam 111 slides over the cam follower 108 of the sub-rocker arm 105. As shown in FIG. 7, the sub-rocker arm 105 is rotationally biased upward by a lost motion spring 112 so that the state of sliding contact between the high-speed cam 111 and the sub-rocker arm 105 is maintained even when the sub-rocker arm 105 is separated from the main rocker arms 104.

As seen in FIG. 7, the linking mechanism for selectively linking the main rocker arms 104 and the sub-rocker arm 105 basically comprises a linking lever 113, a hydraulic plunger 117, a hydraulic cylinder 118, a hydraulic pressure supply passage 120, and so forth. The linking lever 113 is provided beneath the sub-rocker arm 105. This linking lever 113 is rotatably supported by a pin 117 provided to the main rocker arms 104. The upper end portion 113a of the linking lever 113 can be engaged with an engagement step 115 on a lower surface of the sub-rocker arm 105. This linking lever 113 is constantly biased in the disengagement direction by a return spring (not shown) that presses on a protrusion 113c (see FIG. 6) via a spring seat 116a. The hydraulic plunger 117 is disposed across from the lower end portion 113b of the linking lever 113. When the hydraulic plunger 117 sticks out, the linking lever 113 rotates in the engagement direction. Hydraulic pressure is supplied to the hydraulic cylinder 118, in which the hydraulic plunger 117 is slidably disposed, via a fluid hole 119 inside the main rocker arms 104 and via the hydraulic pressure supply passage 120 (see FIG. 7) inside the rocker shaft 103. When hydraulic pressure is supplied through the hydraulic pressure supply passage 120 to the hydraulic cylinder 118, the linking lever 113 rotates in the engagement direction and engages the engagement step 115 of the sub-rocker arm 105. As a result, the sub-rocker arm 105 is pressed downward by the high-speed cam 111, whereupon the main rocker arms 104 and the sub-rocker arm 105 operate integrally, and the intake valves 33 open and close along the cam profile of the high-speed cam 111. When the hydraulic pressure to the hydraulic cylinder 118 is then released, the linking lever 113 is rotated by the return spring in the disengagement direction, and the upper end portion 113a of the linking lever 113 moves away from the engagement step 115. At this point, the sub-rocker arm 105 is separated from the main rocker arms 104, and the intake valves 33 open and close along the cam profile of the low-speed cams 110 via the main rocker arms 104.

Air-Fuel Mixture Inflow to Combustion Chamber During Intake Stroke

Referring back to FIGS. 3A and 3B, how the air-fuel mixture flows into the combustion chamber when the intake valves 33 are opened with a low lift amount (i.e., the intake valves 33 are lifted along the cam profile of the low-speed cams 110) will now be explained.

When the intake valves 33 move from a closed state shown in FIG. 3A to an opened state shown in FIG. 3B, the air-fuel mixture in the intake port 20a flows into the combustion chamber through the first and second intake openings 25a and 25b. When the intake valves 33 are opened with a small amount of lift (with a low lift amount), the lower end of the wall surface 24c of the recess portion 24 is located from 0 mm to about 1 mm below the valve faces 33a of the opened intake valves 33 as seen in FIG. 3B. Thus, a relatively large portion of the air-fuel mixture flows along the bottom surface 24a around the first and second intake openings 25a and 25b and the connecting surface 24b of the recess portion 24. Except for a portion of the air-fuel mixture that flows along the bottom surface 24a headed toward the communication space S1, the air-fuel mixture flowing along the bottom surface 24a of the recess portion 24 hits the wall surface 24c and changes its direction of flow to a downward direction. Meanwhile, the air-fuel mixture that flows from the first intake opening 25a along the bottom surface 24a around the first intake opening 25a in the direction of the connecting surface 24b and the communication space S1, and the air-fuel mixture that flows from the second intake opening 25b along the bottom surface 24a around the second intake opening 25b in a direction toward the connecting surface 24c and the communication space S1 collide in the communication space S1 and the surrounding space thereof. Therefore, the liquid fuel contained in the air-fuel mixture is atomized, and the turbulence of the flow increases. Accordingly, vaporization of the liquid fuel is promoted which results in an improved combustion state and improved exhaust quality. In order to suppress HC emission, it is especially preferable for the fuel to be atomized when the internal combustion engine 1 is operating under low-load and low-speed condition immediately after engine start-up and when the opening and closing of the intake valves 33 is performed with a small lift amount. Since the combustion chamber structure of the present invention has the communication space S1 as explained above, the atomization of the fuel in the combustion chamber is promoted under low-load and low-speed conditions.

Second Embodiment

Referring now to FIGS. 8 to 14, a combustion chamber structure for an internal combustion engine in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The combustion chamber structure of the second embodiment is basically identical to the combustion chamber structure of the first embodiment except that a recess portion 44 formed in a cylinder head lower surface 21' of the second embodiment is shaped differently from the recess portion 24 of the first embodiment. Thus, the combustion chamber structure of the second embodiment is applied to the internal combustion engine 1 illustrated in FIG. 1 except that the recess portion 44 having a planar shape shown in FIG. 8, rather than the recess portion 24 having the planar shape shown in FIG. 2, is formed by machining the cylinder head lower surface 21'.

As shown in FIG. 8, the recess portion 44 basically includes a bottom surface 44a, a connecting surface 44b, and a wall surface 44c. The bottom surface 44a and the connecting surface 44b are arranged to be recessed or stepped from the cylinder head lower surface 21' in a direction substantially parallel to the stem portions 33b of the intake valves 33. In the second embodiment of the present invention, the bottom surface 44a includes two sections, i.e., first and second intake opening formation surfaces, that are formed as a generally circular shape surrounding the first intake opening 25a and the second intake opening 25b, respectively. Moreover, in the second embodiment, the recess portion 44 generally has an outline shown in FIG. 8 with the bottom surface 44a and the connecting surface 44b together forming a substantially flat surface. In the second embodiment, the connecting surface 44b is continuously formed with the bottom surface 44a between the first and second intake openings 25a and 25b and the continuous inner side wall surface 44c extends from the bottom surface 44a and the connecting surface 44b toward an inside portion of the combustion chamber. In other words, the first and second intake openings 25a and 25b are formed within a single recess portion 44 as the first and second intake openings 25a and 25b surrounded by the continuously formed wall surface 44c. Moreover, as seen in FIG. 8, the connecting surface 44b is arranged to have an approximately triangular shape where the base of the triangle shape is arranged on the opposite side from the exhaust openings 22a and 22b.

Similar to the first embodiment of the present invention, the low lift amount of the intake valves 33 is preferably set to a range approximately between 1.5 and 2 mm so that a bottom end of the wall surface 44c of the recess portion 44 is disposed from 0 mm to about 1 mm below the bottom position of the valve faces 33a of the intake valves 33 when the intake valves 33 are opened by the low-speed cams 110 of the variable lift mechanism 2 to their maximum lift amount. Accordingly, when the intake valves 33 are opened at a low lift amount, a particularly large proportion of the air-fuel mixture drawn into the combustion chamber first flows along the bottom surface 44a. Then, a direction of the air-fuel mixture flowing along the bottom surface 44a is deflected downwardly by the wall surface 44c.

Moreover, in addition to the bottom surface 44a located around the first intake opening 25a and the second intake opening 25b, the recess portion 44 also has the connecting surface 44b located between the first intake opening 25a and the second intake opening 25b, which is continuously formed with the bottom surface 44a as being recessed from the cylinder head lower surface 21'. Thus, a communication space S2 is formed between the first and second intake openings 25a and 25b in which the wall surface 44c is not present. The communication space S2 is configured and arranged to allow the air-fuel mixture flowing from first intake opening 25a and the second intake opening 25b to communicate along the bottom surface 44a and the connecting surface 44b of the recess portion 44. Since the connecting surface 44b has the generally triangle shape, the communication space S2 also has the triangle shape as shown in FIG. 8 that veers away from the exhaust openings 22a and 22b. Thus, the communication space S2 of the second embodiment has a larger planar area than the communication space S1 in the first embodiment.

Air-Fuel Mixture Inflow to Combustion Chamber
During Intake Stroke

When the intake valves 33 are opened at a low lift amount, the air-fuel mixture in the intake port 20a flows into the combustion chamber through the first and second intake openings 25a and 25b. When the lift amount is low, a relatively large portion of the air-fuel mixture flows along the bottom surface 44a of the recess portion 44. Except for a part of the air-fuel mixture headed toward the communication space S2 along the connecting surface 44b, the air-fuel mixture flowing along the bottom surface 44a of the recess portion 44 hits the wall surface 44c and changes the direction of flow to a downward direction. On the other hand, the air-fuel mixture that flows from the first intake opening 25a along the bottom surfaces 44a around the first intake opening 25a toward the direction of the connecting surface 44b and the communication space S2, and the air-fuel mixture that flows from the second intake opening 25b along the bottom surface 44a around the second intake opening 25a toward the direction of the connecting surface 44b and the communication space S2 collide in the communication space S2 and the surrounding space thereof. With the collision between the air-fuel mixture from the first and second intake openings 25a and 25b, the liquid fuel contained in the air-fuel mixture is atomized, and the turbulence of the flow increases. Accordingly, vaporization of the liquid fuel is promoted, which results in an improved combustion state and improved exhaust quality.

Moreover, since the communication space S2 is formed in a triangular shape that veers away from the exhaust openings 22a and 22b, a larger portion of the air-fuel mixture that flows from the first and second intake openings 25a and 25b into the interior of the combustion chamber is guided toward the opposite side from the exhaust openings 22a and 22b than to the side closer to the exhaust openings 22a and 22b particularly at the initial stage of the valve lift (i.e., when the intake valves 33 begin to open). Thus, a reverse tumble flow of the air-fuel mixture is formed inside the combustion chamber especially during the initial stage of the valve lift. Accordingly, the portion of the air-fuel mixture flowing from the first and second intake openings 25a and 25b into the combustion chamber and heading toward the exhaust valves 36 decreases. Therefore, adherence of the liquid fuel contained in the air-fuel mixture to the exhaust valves 36 or to surfaces surrounding the exhaust valves 36 is minimized, which would otherwise cause the exhaust gas to contain more unburned fuel.

Figure 14:
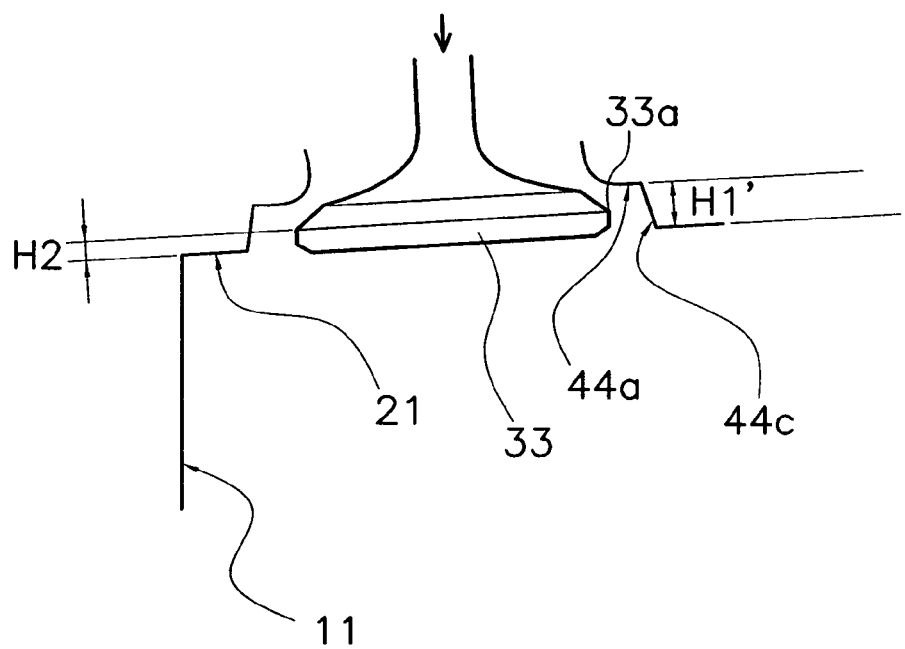
FIG. 14 is a schematic diagram illustrating a preferred relationship between an intake valve and a wall surface of a recess portion in order to form a powerful reverse tumble flow within a combustion chamber.

Furthermore, as shown in FIG. 14, a strong reverse tumble flow can be formed when the recess portion 44 is formed so that the bottom end of the wall surface 44c of the recess portion 44 is disposed about 1 mm below the bottom position of the valve faces 33a of the intake valves 33 when the intake valves 33 are opened by the low-speed cams 110 of the variable lift mechanism 2 to their maximum lift amount. In other words, a strong reverse tumble flow can be formed by arranging the recess portion 44 to have a prescribed height H1' so that a prescribed height H2 between the bottom end of the wall surface 44c of the recess portion 44 and the valve face 33a of the intake valve 33 at the maximum lift by the low-speed cams 110 is set to be about 1 mm in a direction substantially parallel to the valve stem 33b of the intake valve 33.

Fluid Analysis Results

Referring now to FIGS. 9 to 13, results of fluid analysis in which flow of air-fuel mixture into the combustion chamber when the intake valves 33 are opened at a low lift amount was simulated will be explained. In the fluid analysis explained below, a comparison example of combustion chamber with no communication space, and a comparison example of combustion chamber with no recess portion are also examined to compare the flow of the air-fuel mixture inside the combustion chamber of the present invention and the comparison examples of the combustion chamber.

Figure 9A:
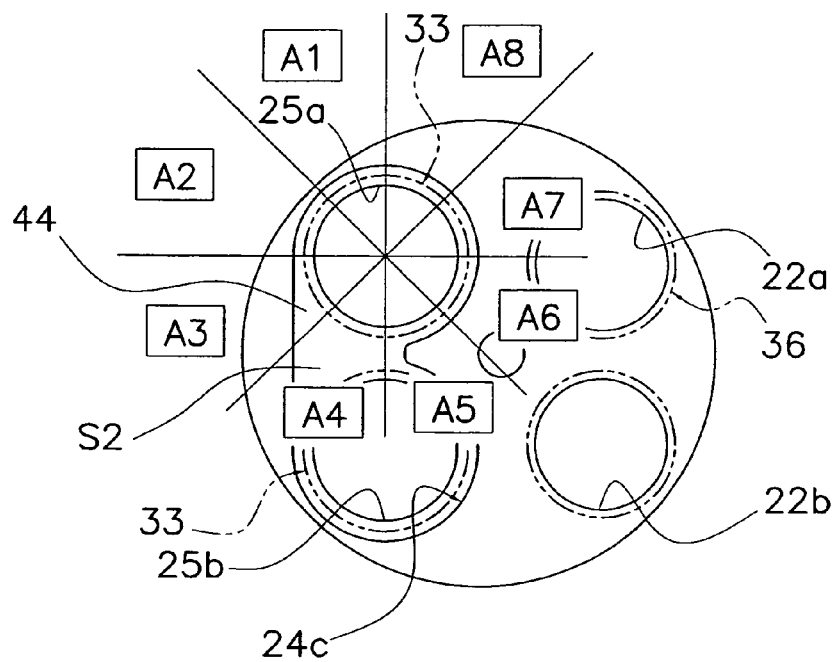
FIG. 9A is a schematic diagram of the cylinder head lower surface for explaining different directions defined with respect to an intake opening formed in the cylinder head lower surface in accordance with the second embodiment of the present invention.
Figure 9B:
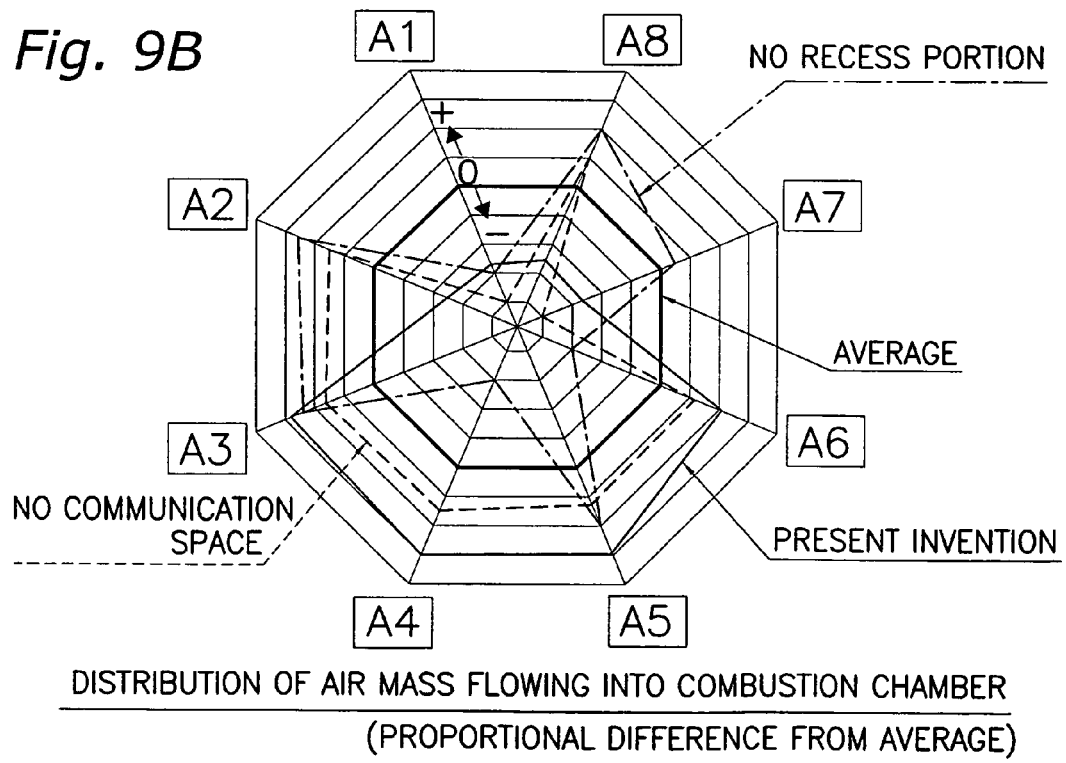
FIG. 9B is a circular chart corresponding to the different directions shown in FIG. 9A illustrating fluid analysis results for the combustion chamber structure in accordance with the second embodiment of the present invention and for comparison examples of combustion chamber structures.

FIG. 9B is a circular line chart for explaining the air mass flow distribution, which indicates the flow directions (among directions A1 to A8) in the combustion chamber that the air-fuel mixture is flowing from the first intake opening 25a as well as the quantity of the air-fuel mixture in each direction. The directions A1 to A8 correspond to the directions A1 to A8 shown in FIG. 9A. As seen in FIG. 9A, the directions A6 and A7 face toward the exhaust openings 22a and 22b. The directions A4 and A5 face toward the adjacent second intake opening 25b. In other words, in the second embodiment, the communication space S2 is formed generally in the directions A4 and A5 defined with respect to the first intake opening 25a.

In FIG. 9B, a thick solid line indicates an average value of the air mass flow in the directions A1 to A8. The air mass flow distribution is plotted using the proportional differences from the average value. In FIG. 9B, the solid line indicates the air mass flow distribution with the combustion chamber structure in accordance with the second embodiment of the present invention. A dashed line indicates the air mass flow distribution with a first comparison combustion chamber structure in which there is no communication space S2. In other words, in the first comparison combustion chamber structure, first and second intake openings are surrounded by a separate wall surfaces, and there is no connecting surface between the bottom surface around the first intake opening and the bottom surface around the second intake opening. A one-dot chain line in FIG. 9B indicates a second comparison combustion chamber structure in which no recess portion 44 is present. In other words, in the second comparison combustion chamber structure, first and second intake openings are directly formed on a cylinder head lower surface.

As seen in FIG. 9B, with the combustion chamber structure of the second embodiment of the present invention, the flow of the air-fuel mixture is concentrated in the directions A3, A4, A5, and A6. The flow of the air-fuel mixture toward the exhaust openings 22a and 22b (in the directions A6 and A7) is less than the flow of the air-fuel mixture toward an opposite side from the exhaust openings 22a and 22b (in the directions A2 and A3). In contrast, with the first comparison combustion chamber structure with no communication space S2 (indicated by the dashed line), it can be seen that compared to the combustion chamber structure of the second embodiment, there is less flow of the air-fuel mixture toward the adjacent second intake opening 25b (in the directions A4 and A5). Thus, with the first comparison combustion chamber structure, little effect of atomizing the liquid fuel contained in the air-fuel mixture through collision between the air-fuel mixture flowing from the first and second intake openings 25a and 25b can be anticipated. Also, with the second comparison combustion chamber structure with no recess portion 44 (indicated by the one-dot chain line), it can be seen that less air-fuel mixture flows toward the adjacent second intake opening 25b (in the directions A4 and A5). Thus, again, little effect of atomizing the liquid fuel contained in the air-fuel mixture through collision between the air-fuel mixture flowing from the first and second intake openings 25a and 25b can be anticipated.

Figure 10:
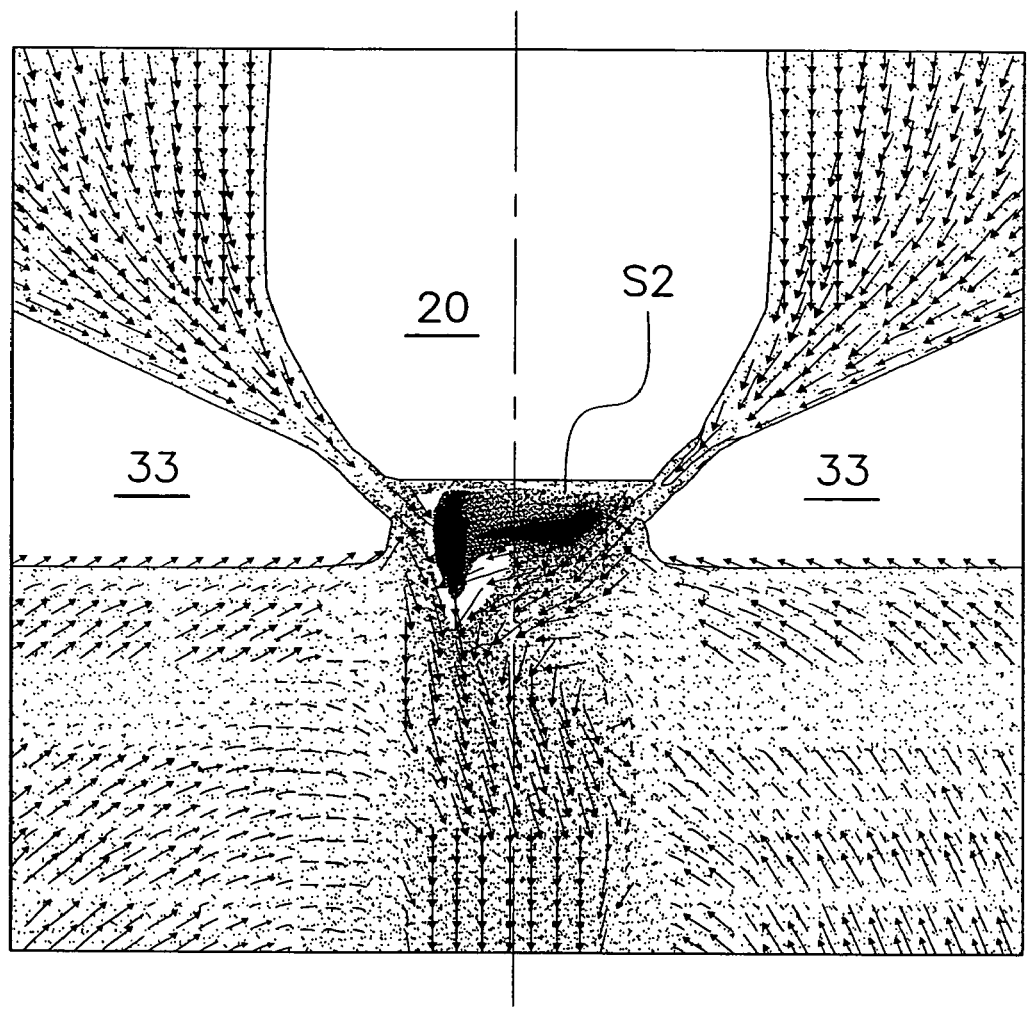
FIG. 10 is a schematic diagram of a fluid analysis result illustrating a distribution of turbulence between a pair of intake valves of the combustion chamber structure with a communication space and a recessed portion formed between intake openings in accordance with the second embodiment of the present invention.
Figure 11:
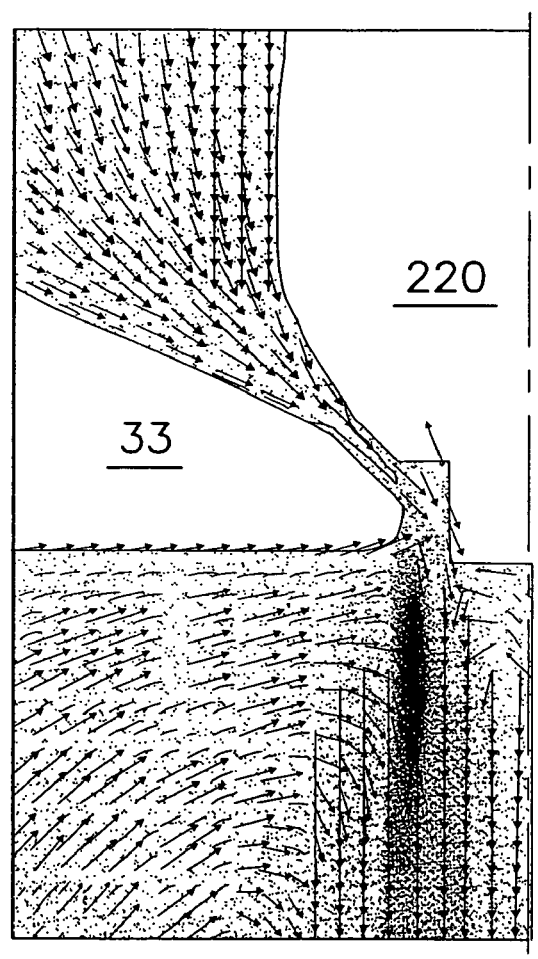
FIG. 11 is a schematic diagram of a fluid analysis result (corresponding to FIG. 10) illustrating a distribution of turbulence in the vicinity of an intake valve in a comparison example of a combustion chamber structure with no communication space.
Figure 12:
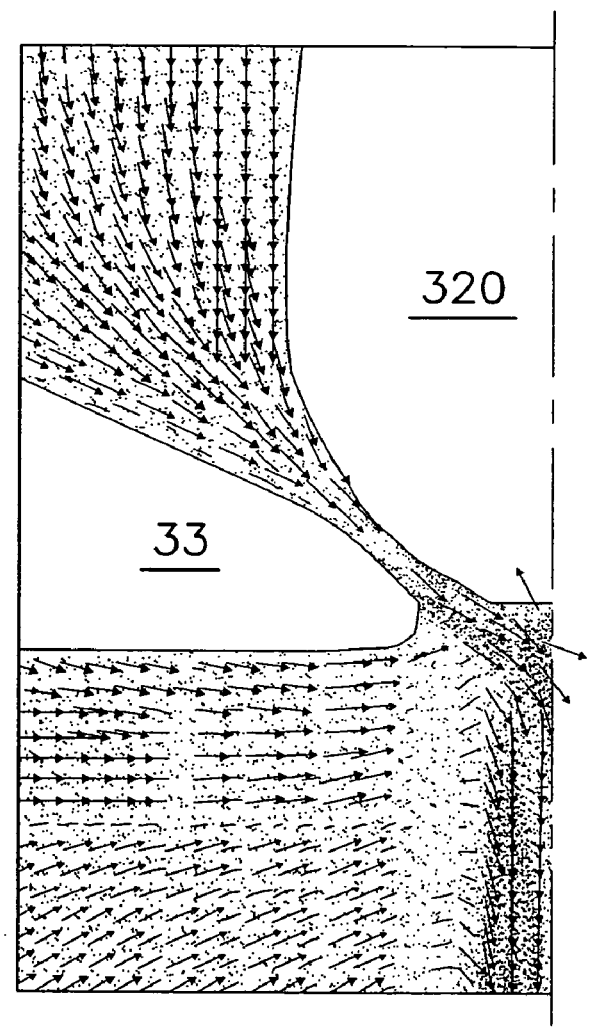
FIG. 12 is a schematic diagram of a fluid analysis result (corresponding to FIG. 10) illustrating a distribution of turbulence in the vicinity of an intake valve in a comparison example of a combustion chamber structure with no recessed portion.

FIG. 10 is a schematic diagram of a fluid analysis result illustrating the distribution of turbulence in the combustion chamber between the intake valves 33 taken along a section line X—X in FIG. 8. In FIGS. 10 to 12, the turbulence is indicated as becoming stronger as a portion inside the combustion chamber is depicted as becoming darker, the stronger the turbulence is. FIG. 11 is a schematic diagram of a fluid analysis result illustrating the distribution of turbulence in the first comparison combustion chamber structure. As seen in FIG. 11, a cylinder head 220 is provided with no communication space S2, and a wall surface corresponding to the wall surface 44c of the second embodiment is present between the two intake valves 33. FIG. 12 is a schematic diagram of a fluid analysis result illustrating the distribution of turbulence in the second comparison combustion chamber structure. As seen in FIG. 12, a cylinder head 320 is provided with no portion corresponding to the recess portion 44 of the second embodiment. As can be seen from a comparison of the fluid analysis results with the first comparison combustion chamber structure shown in FIG. 11 (no communication space S2) and the fluid analysis results with the second comparison combustion chamber structure shown in FIG. 12 (no recess portion 44), extremely strong air-fuel mixture turbulence is generated in the communication space S2 with the combustion chamber structure of the second embodiment. Thus, the atomization of the liquid fuel in the air-fuel mixture is promoted in the present invention.

Figure 13:
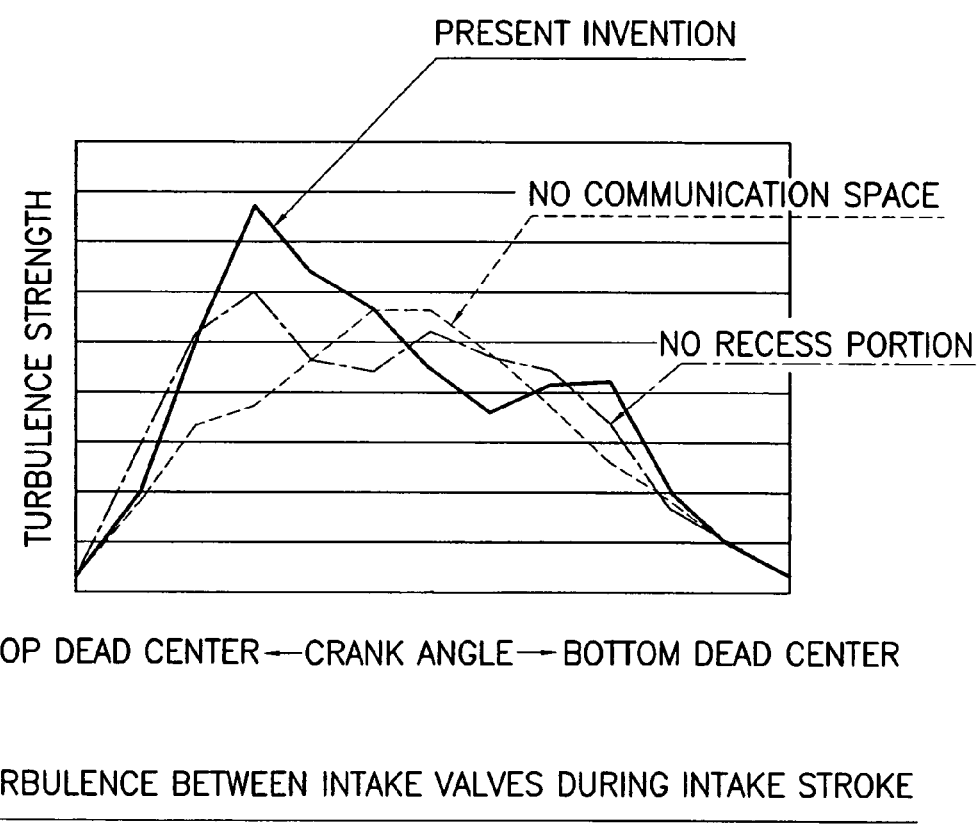
FIG. 13 is a line chart illustrating changes in turbulence in a portion between the intake openings for the combustion chamber structure in accordance with the second embodiment of the present invention and the comparison examples of the combustion chamber structures.

FIG. 13 is a line chart for explaining the change in turbulence between the intake valves 33 during an intake stroke. The line chart in FIG. 13 indicates that with the combustion chamber structure of the second embodiment, extremely strong air-fuel mixture turbulence is produced in the communication space S2 between the intake valves 33 at the beginning of the intake stroke.

The above-mentioned fluid analysis results illustrate situations for when the intake valves 33 are at their maximum lift amount during low lift operation, and not for situations at the initial stage of the valve lift. Thus, one of the benefits of the combustion chamber structure of the second embodiment, that is, the reverse tumble in the air-fuel mixture flow at the initial stage of the valve lift, do not appear distinctly. However, it has been discovered that with the combustion chamber structure of the second embodiment, at the initial stage of the valve lift, less of the air-fuel mixture flowing from the first and second intake openings 25a and 25b into the combustion chamber is headed toward the exhaust valves 36 side. Thus, the adherence of the liquid fuel contained in the air-fuel mixture to exhaust valves 36 or to the surfaces surrounding the exhaust valves 36 can be minimized, which would otherwise cause the exhaust gas to contain more unburned fuel.

Third Embodiment

Figure 15:
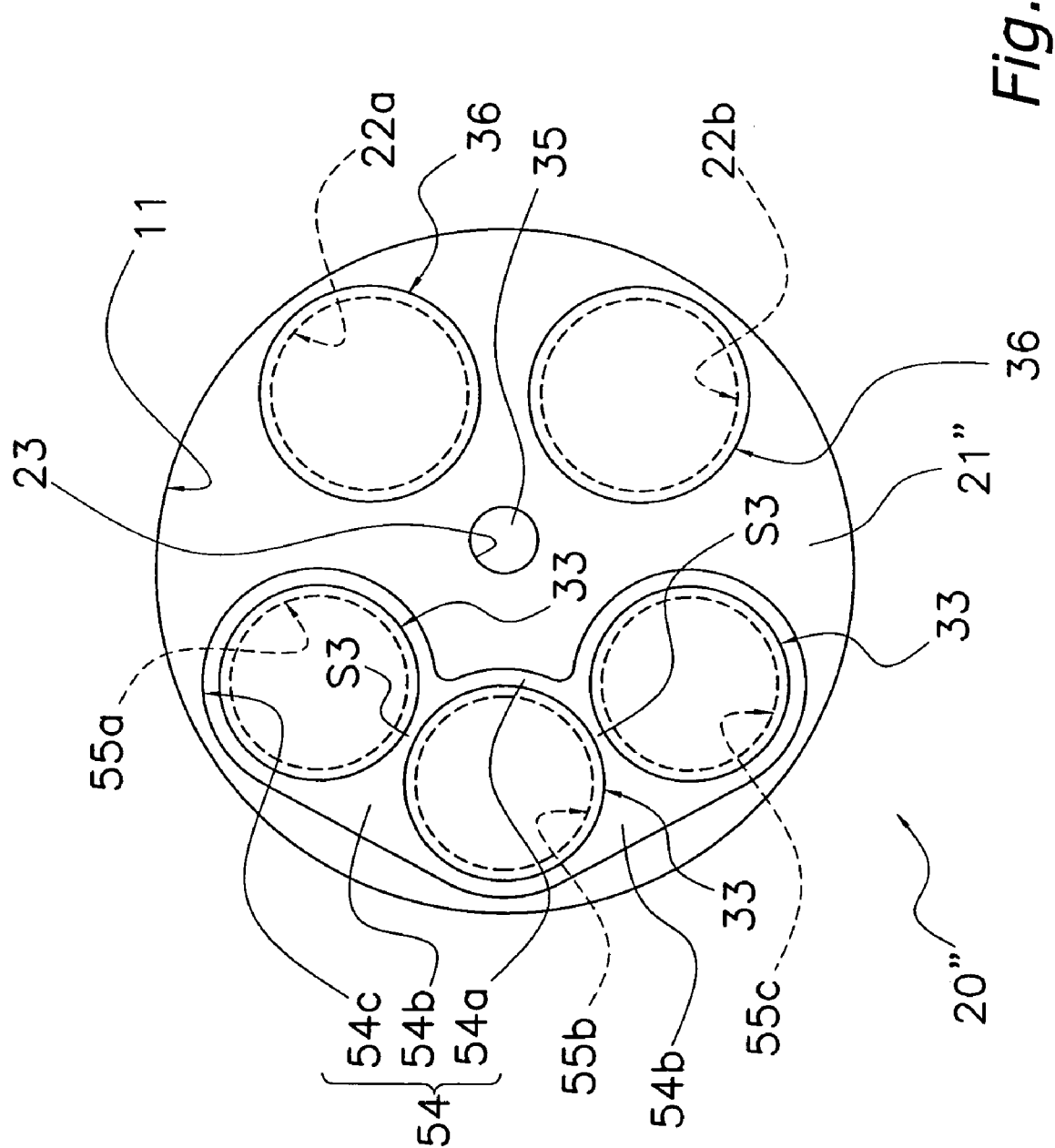
FIG. 15 is a bottom plan view (corresponding to FIG. 8) of a cylinder head lower surface of a combustion chamber with intake and exhaust valves in accordance with a third embodiment of the present invention.

Referring now to FIG. 15, a combustion chamber structure in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first and/or second embodiment may be omitted for the sake of brevity. The parts of the third embodiment that differ from the parts of the first and/or second embodiment will be indicated with a double prime (").

The combustion chamber structure of the third embodiment is adapted to a cylinder head 21" that is configured and arranged to have three intake openings, instead of two as in the first and second embodiments, per combustion chamber. Thus, a cylinder head lower surface 21" includes three intake openings (first, second and third intake openings 55a, 55b and 55c) configured and arranged to be coupled to three intake valves 33 respectively. Thus, the combustion chamber structure of the third embodiment is basically identical to the combustion chamber structure of the second embodiment except that a planar shape of a recess portion 54 formed in a cylinder head lower surface 21" is different such that the recess portion 54 is arranged to surround the first, second and third intake openings 55a, 55b and 55c.

More specifically, in the combustion chamber structure of the third embodiment, the recess portion 54 is arranged to have the planar shape shown in FIG. 15 by machining the cylinder head lower surface 21". The recess portion 54 basically includes a bottom surface 54a, a connecting surface 54b and a wall surface 54c. Similarly to the first and second embodiments, the bottom surface 54a and the connecting surface 54b are recessed from the cylinder head lower surface 21" with the wall surface 54c extending between the cylinder head lower surface 21" and the bottom surface 54a or the connecting surface 54b in a direction toward an inside portion of the combustion chamber. In the third embodiment, the bottom surface 54a includes three sections (first, second and third intake opening formation surfaces) that are disposed in the peripherally portions of the first, second and third intake openings 55a, 55b and 55c, respectively. Thus, the recess portion 54 is configured to form a step (including a first stem formed by the first intake opening formation surface, a second step formed by the second intake opening formation surface, and a third step formed by the third intake opening formation surface) between the bottom surface 54a and the cylinder head lower surface 21".

As mentioned above, the wall surface 54c is continuously formed to surround the first, second and third intake openings 55a, 55b and 55c in a plan view as shown in FIG. 15. In other words, the wall surface 54c is arranged to form a single opening on the cylinder head lower surface 21" that encloses the first, second and third intake openings 55a, 55b and 55c.

The connecting surface 54b includes two sections (first and second connecting surfaces) that are continuously formed with the bottom surface 55a and are respectively disposed between the first and second intake openings 55a and 55b, and between the second and third intake openings 55b and 55c as seen in FIG. 15. In the third embodiment, the connecting surface 54b and the bottom surface 54a are preferably disposed substantially on the same plane). Thus, the connecting surface 54b is configured and arranged to form first and second connecting steps between the connecting surface 54b and the cylinder head lower surface 21" between the first and second intake openings 55a and 55b, and between the second and third intake openings 55b and 55c. In other words, the connecting surface 54b is configured and arranged to form a pair of communication spaces S3, in which the wall surface 54c is not present, between the first and second intake openings 55a and 55b, and between the second and third intake openings 55b and 55c, respectively. The communication spaces S3 are configured and arranged to allow communication between the air-fuel mixture flowing from the first intake opening 55a and the second intake opening 55b, and between the air-fuel mixture flowing from the second intake opening 55b and the third intake opening 55c, along the bottom surface 54a and the connecting surface 54b. The two communication spaces S3 shown in FIG. 15 are arranged to veer away from the exhaust openings 22a and 22b in between the first intake opening 55a and the second intake opening 55b, and in between the second intake opening 55b and the third intake opening 55c.

Accordingly, with the third embodiment of the present invention, even with a combustion chamber in which three intake openings (the first, second and third intake openings 55a, 55b, and 55c) that are opened and closed by intake valves 33 are formed, the communication spaces S3 are provided between the first and second intake openings 55a and 55b, and between the second and third intake openings 55b and 55c while the wall surface is provided around the first, second and third intake openings 55a, 55b, and 55c. Therefore, the air-fuel mixture flowing into the combustion chamber from the first, second and third intake openings 55a, 55b and 55c will collide in the communication spaces S3. Thus, the liquid fuel contained in the air-fuel mixture will be atomized, which has the effects of improving the combustion state and the exhaust quality.

Fourth Embodiment

Figure 16:
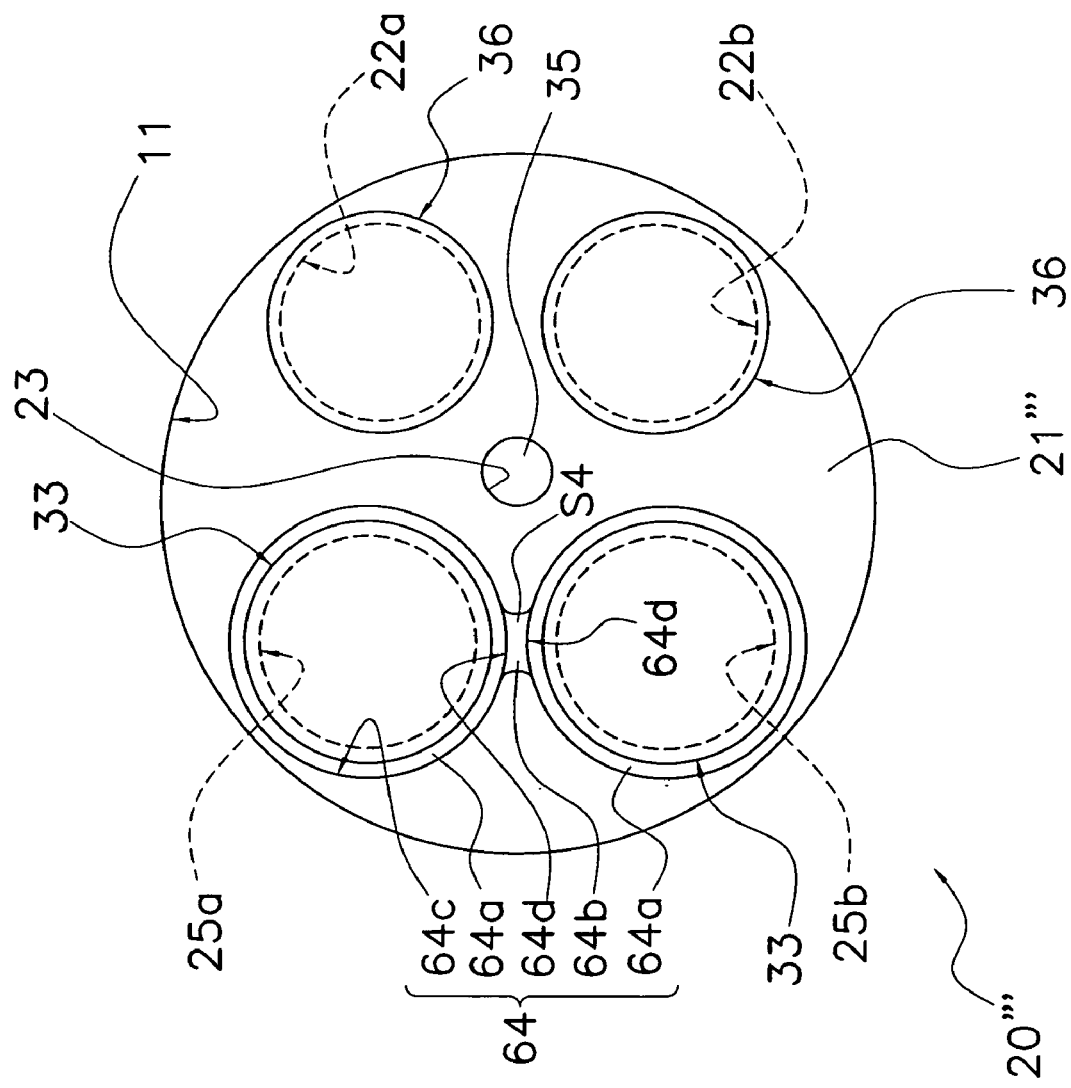
FIG. 16 is a bottom plan view (corresponding to FIG. 2) of a cylinder head lower surface of a combustion chamber with intake and exhaust valves in accordance with a fourth embodiment of the present invention.
Figure 17:
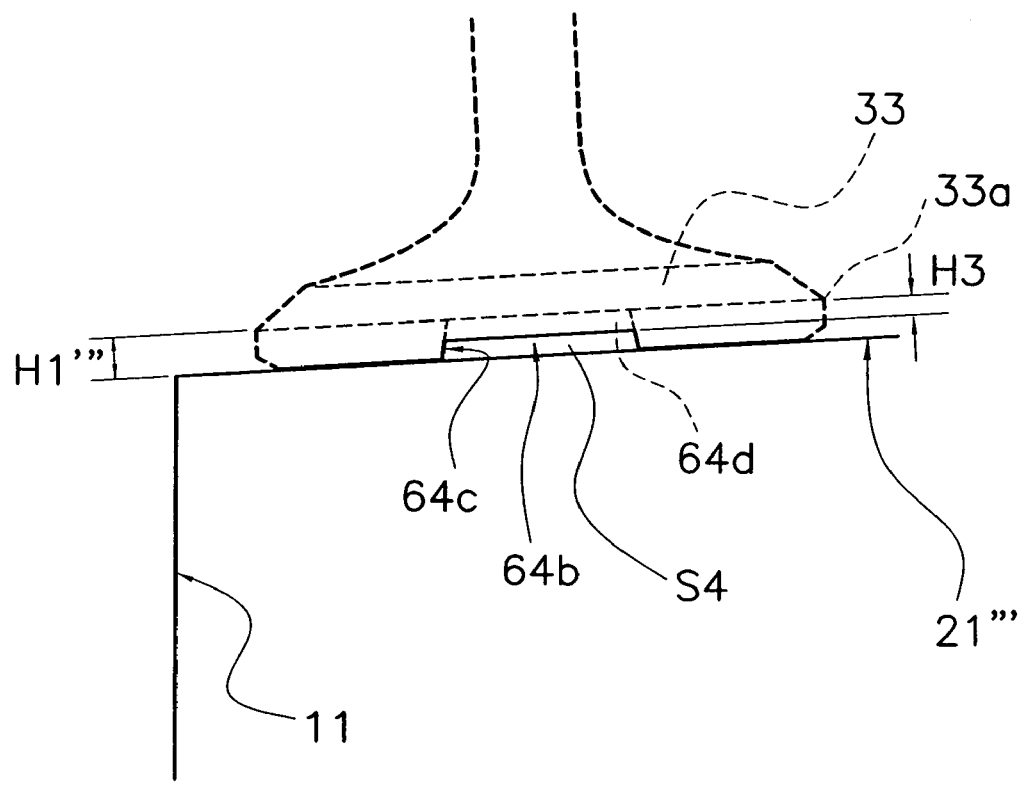
FIG. 17 is an enlarged schematic partial cross sectional view of the combustion chamber illustrating a state in which the intake valve is closed in accordance with the fourth embodiment of the present invention taken along a section line XVII—XVII in FIG. 16.

Referring now to FIGS. 16 and 17, a combustion chamber structure in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a triple prime (''').

With the combustion chamber structure of the above explained embodiments, such as the first embodiment as shown in FIGS. 2 and 4, the bottom surface 24a and the connecting surface 24b are arranged to be substantially on the same plane so that no wall surface 24c is present in the communication space S1 between the first intake opening 25a and the second intake opening 25b. With such structure, that the communication space S1 is arranged to allow the air-fuel mixture flowing from the first intake opening 25a and the second intake opening 25b to communicate along the bottom surface 24a and the connecting surface 24b. Consequently, when the intake valves 33 are opened at a low lift amount, a portion of the air-fuel mixture drawn from the first intake opening 25a into the combustion chamber that flows along the bottom surface 24a and the connecting surface 24b in the direction of the communication space S1 collides with a portion of the air-fuel mixture drawn from the second intake opening 25b into the combustion chamber that flows along the bottom surface 24a and the connecting surface 24b in the direction of the communication space S1 in the communication space S1 and in the surrounding space thereof. This collision between the air-fuel mixtures promotes atomization of the liquid fuel contained in the air-fuel mixture as explained above.

The combustion chamber structure of the fourth embodiment is basically identical to the combustion chamber structure of the second embodiment except that an inter-opening wall surface or connecting wall surface 64d is provided between a bottom surface 64a and a connecting surface 64b to form a step therebetween. In other words, in the fourth embodiment of the present invention, instead of ensuring the communication space S1 by not forming the wall surface 24c between the first intake opening 25a and the second intake opening 25b as in the first embodiment, a communication space S4 is formed between the first and second intake openings 25a and 25b by providing the connecting wall surface 64d that is lower in height than a wall surface 64c corresponding to the wall surface 24c in the first embodiment. Thus, although both the bottom surface 64a and the connecting surface 64b are recessed from a cylinder head lower surface 21, the communication space S4 is formed such that the bottom surface 64a are further recessed from the connecting surface 64b in the fourth embodiment. In other words, the recess portion 64 of the fourth embodiment is formed such that the connecting wall surface 64d has a prescribed height H3 that is smaller than a prescribed height H1''' of the wall surface 64c as measured from the bottom surface 64a of the recess portion 64.

Similar to the first embodiment explained above, the communication space S4 is configured and arranged to allow communication between the air-fuel mixtures flowing from the first intake opening 25a and the second intake opening 25b beyond the bottom surface 64a of the recess portion 64.

More specifically, the recess portion 64 of the fourth embodiment basically comprises the bottom surface 64a, the connecting surface 64b, the wall surface 64c and the connecting wall surface 64d. As in the first embodiment, the bottom surface 64a includes two sections (first and second intake opening formation surfaces) that are disposed in the peripherally of the first and second intake openings, respectively. The bottom surface 64a is recessed from the cylinder head lower surface 21''' as the wall surface 64c extending between the bottom surface 64a and the cylinder head lower surface 21'''. Moreover, in the fourth embodiment, the connecting wall section 64d is continuously formed with the wall surface 64c and the connecting surface 64b between the connecting surface 64b and the bottom surface 64a such that the connecting surface 64c is recessed from the cylinder head lower surface 21''' by a height smaller than the height of the recess portion 64 (i.e., the prescribed height H1''' of the wall surface 64c). In other words, the connecting surface 64b is machined shallower than the bottom surface 64a. The wall surface 64c and the connecting wall surface 64d are both configured and arranged to extend from the bottom surface 64a toward an inside portion of the combustion chamber. Accordingly, in the fourth embodiment, the height of the step formed between the bottom surface 64a and the cylinder head lower surface 21''' is higher than the height of the step formed between the connecting surface 64b and the cylinder head lower surface 21'''.

Even when the recess portion 64 shown in FIGS. 16 and 17 is formed in the cylinder head lower surface 21''' instead of the recess portion 24 shown in FIG. 2 in the first embodiment, the communication space S4 is ensured because the height of the connecting wall surface 64d (H3) formed between the first intake opening 25a and the second intake opening 25b is lower than the height of the wall surface 64c (H1'''). Therefore, a large portion of the air-fuel mixtures drawn in from the first and the second intake openings 25a and 25b collide in the communication space S4. Thus, the liquid fuel contained in the air-fuel mixture is atomized.

In the fourth embodiment, the connecting wall surface 64d and the wall surface 64c extend from the bottom surface 64a in a direction toward the inside or the combustion chamber at substantially the same angle so that the connecting wall surface 64d is continuously formed with the wall surface 64c. However, it is also possible to use a structure in which the connecting wall surface 64d is slanted toward the communication space S4 so that so that a larger portion of the air-fuel mixture will flow into the communication space S4 and to promote collision between the air-fuel mixture flowing from the first and second intake openings 25a and 25b.

Also, the combustion chamber structure of the fourth embodiment can also be adapted for use when three intake openings (the first intake opening 55a, second intake opening 55b, and third intake opening 55c) are provided in the combustion chamber as in the third embodiment shown in FIG. 15. In such a case, a connecting wall surface corresponding to the connecting wall surface 64d is formed between the connecting surface 54b and the bottom surface 54a between the first and second intake openings 55a and 55b, and between the connecting surface 54b and the bottom surface 54a between the second and third intake openings 55b and 55c. By forming a height of such connecting wall surface lower than the height of the wall surface 54c, communication spaces can be formed that allows communication between the air-fuel mixtures flowing from the first and second intake openings 55a and 55b, and between the air-fuel mixtures flowing from the second and third intake openings 55b and 55c, beyond the bottom surface 54a of the recess portion 54.

Accordingly, with the combustion chamber structure in accordance with the present invention, the liquid fuel in an air-fuel mixture is atomized upon entering the interior of the combustion chamber. Thus, the combustion state is improved, and the problem of unburned fuel components being discharged and lowering the exhaust quality is improved. Therefore, the combustion chamber structure in accordance with the present invention is useful as an internal combustion engine combustion chamber in which an air-fuel mixture is drawn in and combusted.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A combustion chamber structure for an internal combustion engine comprising:
    a combustion chamber surface;
    a first intake opening formation surface surrounding a first intake opening, the first intake opening formation surface being recessed from the combustion chamber surface to form a first step;
    a second intake opening formation surface surrounding a second intake opening, the second intake opening formation surface being recessed from the combustion chamber surface to form a second step;
    a first connecting surface interconnecting the first and second intake opening formation surfaces, the first connecting surface being recessed from the combustion chamber surface to form a first connecting step and a communication space being formed between the first and second intake openings; and
    a peripheral wall surface extending from the first and second intake opening formation surfaces and the first connecting surface to the combustion chamber surface in a direction toward an inside portion of a combustion chamber to define the first and second steps and the first connecting step.

2. The combustion chamber structure according to claim 1, wherein
    the peripheral wall surface is configured and arranged to change the direction of air-fuel mixtures flowing from the first and second intake openings along the first and second intake opening formation surfaces, respectively, as the air-fuel mixtures collide against the peripheral wall surface.

3. The combustion chamber structure according to claim 1, wherein
    the first and second intake opening formation surfaces and the first connecting surface are arranged on a single plane such that heights of the first and second steps and the first connecting step are substantially equal.

4. The combustion chamber structure according to claim 1, wherein
    the peripheral wall surface is continuously formed to define a continuous recess portion in the combustion chamber surface that encompasses the first and second intake openings.

5. The combustion chamber structure according to claim 1, wherein
    the combustion chamber surface defines a pair of exhaust openings, and
    the first connecting surface is located to form the communication space between the first and second intake openings that extends in a direction further away from the exhaust openings than in a direction toward the exhaust openings relative to a centerline that interconnects center points of the first and second intake openings.

6. The combustion chamber structure according to claim 1, wherein
    the combustion chamber surface forms an upper surface of a combustion chamber, and
    the first and second intake opening formation surfaces generally face across from a piston crown surface that forms a bottom surface of the combustion chamber.

7. The combustion chamber structure according to claim 1, further comprising
    a third intake opening formation surface surrounding a third intake opening, the third intake opening formation surface being recessed from the combustion chamber surface to form a third step; and
    a second connecting surface interconnecting the second and third intake opening formation surfaces, the second connecting surface being recessed from the combustion chamber surface to form a second connecting step with a communication space being formed between the second and third intake openings, the peripheral wall surface being further configured and arranged to extend from the third intake opening formation surface and the second connecting surface to the combustion chamber surface in the direction toward an inside portion of a combustion chamber to further define the third step and the second connecting step.

8. The combustion chamber structure according to claim 7, wherein
the peripheral wall surface is continuously formed to define a recess portion that encloses the first, second and third intake openings.

9. The combustion chamber structure according to claim 7, wherein
the combustion chamber surface defines a pair of exhaust openings, and
the first connecting surface and the second connecting surface are located to form the communication spaces between adjacent pairs of the first, second and third intake openings such that each of the communication spaces extends in a direction further away from the exhaust openings than in a direction toward the exhaust openings relative to a center line interconnecting the first and third intake openings.

10. The combustion chamber structure according to claim 1, further comprising
an valve disposed in each of the first and second intake openings such that an intake air amount is controlled by controlling valve lift amount of the intake valves, and
a variable lift mechanism operatably coupled to intake valves to vary the valve lift amount of the intake valves.

11. The combustion chamber structure according to claim 10, wherein
the variable lift mechanism is further configured and arranged to control the valve lift amount at least between a high lift amount operation and a low lift amount operation, and
the peripheral wall surface is configured and arranged such that the combustion chamber surface in the vicinity of the intake valves is disposed below a bottom end portion of a valve face of each of the intake valves by a prescribed amount equal to or greater than zero as measured in a direction substantially parallel to a stem portion of one of the intake valves when the intake valves are opened with a maximum amount in the low lift amount operation.

12. The combustion chamber structure according to claim 11, wherein
the prescribed amount is set in a range between zero and approximately 1 mm.

13. The combustion chamber structure according to claim 1, wherein
the first and second intake opening formation surfaces and the first connecting surface are recessed from the combustion chamber surface such that a height of the first and second steps is greater than a height of the first connecting step.

14. The combustion chamber structure according to claim 13, wherein
the peripheral wall surface is configured and arranged to change a direction of air-fuel mixtures flowing from the first and second intake openings along the first and second intake opening formation surfaces, respectively, as the air-fuel mixtures collide against the peripheral wall surface.

15. A combustion chamber structure for an internal combustion engine comprising:
combustion chamber surface forming means for forming a combustion chamber surface;
first intake opening forming means for defining a first intake opening, the first intake opening forming means being recessed from the combustion chamber surface to form a first step;
second intake opening forming means for defining a second intake opening, the second intake opening forming means being recessed from the combustion chamber surface to form a second step;
surface connecting means for interconnecting the first and second intake opening forming means and forming a communication space between the first and second intake openings, the surface connecting means being recessed from the combustion chamber surface; and
peripheral wall means for extending from the first and second intake opening formation surfaces and the first connecting surface to the combustion chamber surface in a direction toward an inside portion of a combustion chamber.

* * * * *